Nov. 28, 1967   P. DIETIKER ETAL   3,354,901
CONTROL APPARATUS

Filed May 18, 1965    2 Sheets-Sheet 1

INVENTORS
PAUL DIETIKER
KEITH T. KRUEGER
HUGH M. MORGAN
BY *Alan M. Staubly*
ATTORNEY Nov. 28, 1967 P. DIETIKER ET AL 3,354,901

CONTROL APPARATUS

Filed May 18, 1965 2 Sheets-Sheet 2

INVENTORS
PAUL DIETIKER
KEITH T. KRUEGER
HUGH M. MORGAN

BY *Alan M. Staubly*

ATTORNEY

United States Patent Office 3,354,901
Patented Nov. 28, 1967

3,354,901
CONTROL APPARATUS
Paul Dietiker, Redondo Beach, Keith T. Krueger, Garden Grove, and Hugh M. Morgan, Los Angeles, Calif., assignors to Honeywell Inc., Minneapolis, Minn., a corporation of Delaware
Filed May 18, 1965, Ser. No. 456,705
22 Claims. (Cl. 137—495)

The present invention relates to control apparatus and more particularly to fluid flow control valves. Specifically the invention is concerned with an improved pressure regulator valve particularly useful for controlling the flow of gaseous fuels.

In many applications it is necessary that the pressure of a fluid supplied to a device such as a burner, be maintained substantially constant even though the supply pressure may vary. This is accomplished, to a greater or lesser degree, by various types of pressure regulator valves. However, most of the previous valves of this type have been subject to the problem that outlet pressure can be maintained constant only over a relatively small range of inlet pressures. In many instances, in the case of valves controlling the supply of fuel to a burner, it is desired that an initial, relatively small, flow be provided for ignition purposes and then, after a time delay during which ignition is accomplished, full flow is established. Various types of valves have been proposed in the past to give this so-called step opening function but they generally have required complicated mechanisms to provide the time delay and the step and also, they have generally not provided pressure regulation at both pressure levels.

Our invention provides a pressure regulator valve which is capable of maintaining a substantially uniform outlet pressure over a relatively wide range of inlet pressures and which provides pressure regulation at a relatively low pressure upon initial operation of the valve and, after a time delay, a varying of the loading on the operating mechanism for the regulator to cause regulation at a substantially greater pressure. This time delay and variation of the loading of the regulator operating means is provided by a simple, pressure operated means which makes use of the pressure of the fluid being conveyed.

In a preferred form of our invention, there is provided a servo-type regulator valve including a main pressure operated valve having an inlet, an outlet, an apertured wall between the inlet and outlet, and a main valve cooperable with the aperture in the wall to control the flow of fluid through the valve. The main valve also has a pressure chamber having a movable wall which is operably connected to the main valve. A first fluid passage extends between the inlet and the pressure chamber and a control valve in this passage controls fluid flow between the inlet and the pressure chamber. A second fluid pasage is provided between the pressure chamber and the outlet of the main valve and this second passage has a modulating exhaust valve disposed therein. An operating means, responsive to outlet pressure positions the modulating valve to maintain a uniform pressure in the outlet of the main valve whenever the control valve is open. The elements of the valve structure are so constructed and arranged that the pressure chamber is exhausted whenever the control valve in the first fluid passage is closed. Associated with the operating means for the modulating valve is a time delay means which is operable to cause the main valve to maintain a predetermined higher pressure in the outlet a predetermined time after the main valve opens. Preferably this time delay means is operated by the pressure of the fluid being controlled by the valve.

The structure described above may also be utilized as a pressure regulator valve which operates only at a single pressure regulating level by eliminating the time delay means mentioned above. When this is done, our structure still provides a servo-type pressure regulating valve which is a substantial improvement over prior art devices since it is effective to maintain a substantially uniform outlet pressure over a wide range of inlet pressures.

Our invention also contemplates the combination of the time delay and loading mechanism with a conventional direct acting pressure regulator valve connected so that the outlet of the pressure regulating valve supplies fuel to an on-off valve. Pressure downstream from the on-off valve is connected to provide the pressure for the pressure operated means which provides the time delay and variable loading function.

Various objects and advantages of our invention will become apparent upon reading the following description with reference to the accompanying drawing wherein.

Figure 3:
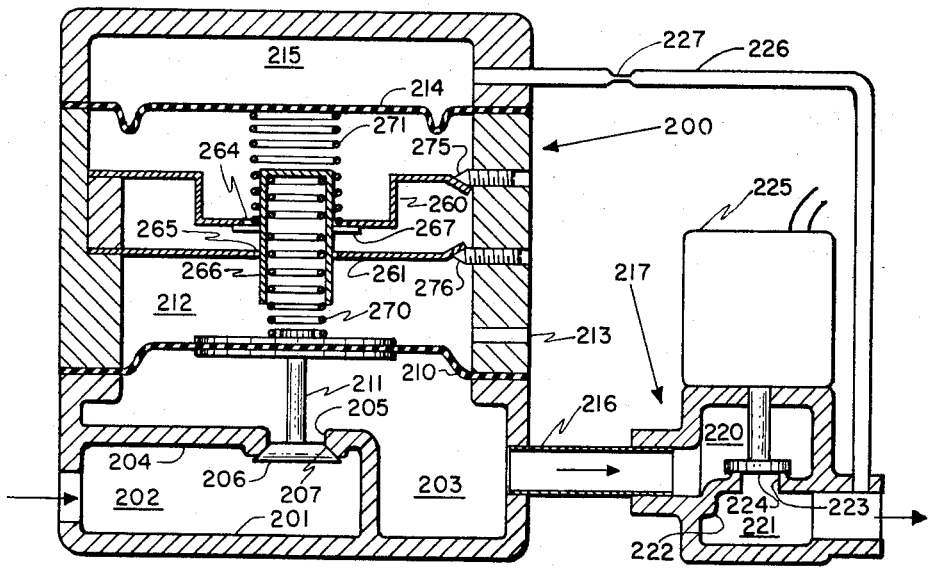

FIGURE 3 discloses a direct acting pressure regulator valve modified according to our invention.

Figure 1:
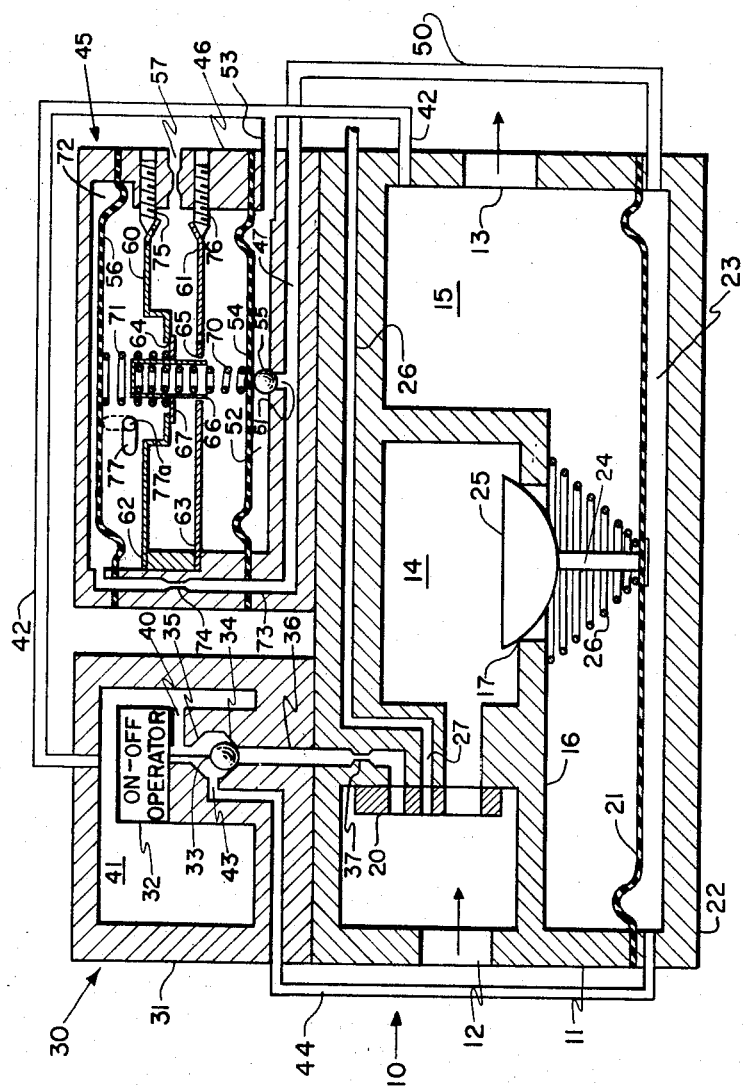
FIGURE 1 is a schematic representation of a servo-type pressure regulator valve constructed according to our invention.

Referring to FIGURE 1, the numeral 10 generally designates a pressure regulator valve having a main valve body 11 with an inlet 12 and an outlet 13. Inside the body 11 is an inlet chamber 14 and an outlet chamber 15 separated by a wall 16 having an aperture 17 therethrough. Intermediate inlet 12 and inlet chamber 14 there is disclosed a manually operable valve 20 which may be a conventional disk or plug type valve with a manual operating means (not shown). The lower portion of main valve body 11 is formed with an opening which is covered by an operating diaphragm 21 which is clamped, at its periphery, between the lower portion of body 11 and a generally cup-shaped member 22 which acts as a cover for the lower portion of the body. The space between diaphragm 21 and member 22 forms a pressure or control chamber 23. Diaphragm 21 is operably connected, as by a stem 24, to a main valve closure member 25 which is disposed in inlet chamber 14 and is cooperable with opening 17 in wall 16 to control fluid flow through the valve. A spring 26 urges diaphragm 21 toward chamber 23 and normally maintains closure member 25 closed.

In addition to the main passage through the valve, defined by inlet 12, inlet chamber 14, opening 17, outlet chamber 15 and outlet port 13, valve body 11 may also be provided with a pilot burner port which may also be controlled by the manual valve 20.

As will be seen from FIGURE 1, the pressure regulator valve is actually a servo-type valve, that is, it is a pressure operated valve wherein the main valve closure member is controlled by a plurality of pilot or servo valves. The first of these pilot valves is a two-position control valve designated by the numeral 30 and includes a valve body 31 which is mounted directly on the top of valve body 11. Control valve 30 functions as a three-way or diverting valve to provide on-off control of the main valve. Specifically, the valve 30 has an on-off operator 32 which may be of any desired type, for example a solenoid operator controlled by a room thermostat. Operator 32 is connected to a valve closure member 33 and has an "off" position wherein closure member 33 engages a valve seat or port 34 and an "on" position wherein the closure member engages a seat or port 35. Port 34 is connected to a passage 36 which extends through control valve body 31 and also through main valve body 11 to the inlet of the main valve. Passage 36 may be provided with a flow restriction 37 and this passage may also be controlled by manual valve 20 as shown in the drawing. Port 35 of valve 30 is connected by a passage 40 to a main chamber 41 in valve 30 which is in turn connected by a passage 42 to outlet chamber 15 of the main valve. An additional port 43, intermediate ports 34 and 35 in valve 30, is connected by a passage 44 to pressure chamber 23 of the main valve. Thus, it will be seen that by operation of the on-off operator 32, pressure chamber 23 is connected to outlet pressure when the operator is in the position shown in FIGURE 1 and, when the operator is energized, pressure chamber 23 is connected to inlet pressure.

Also mounted on top of body member 11 is a pressure operated modulating operator or pilot valve 45 which has a valve body 46. Valve 45 has a first chamber 47 which is connected to pressure chamber 23 in the main valve by a passage 50. Connected to chamber 47 by a port 51, is an operating chamber 52 which is connected to outlet chamber 15 of the main valve by appropriate means such as a passage 53 which connected into the before mentioned passage 42. A movable wall, such as a diaphragm 54 forms one side of the chamber 52 with diaphragm 54 being movable toward and away from port 51. Disposed between diaphragm 54 and the opening of port 51 into chamber 52, is a valve closure member which preferably is a spherical member 55.

Also disposed in body 46, generally parallel to and spaced from diaphragm 54, is another movable wall which preferably takes the form of a diaphragm 56. The space between the two diaphragms preferably is connected to atmosphere as by a restricted orifice 57. Also mounted in the space between the two diaphragms are a pair of lever members 60 and 61 which are cantilevered on the body 46 as at 62 and 63, respectively, by any appropriate means. Preferably the two levers extend generally parallel and spaced from one another and also generally parallel to diaphragms 54 and 56. The levers 60 and 61 have aligned apertures 64 and 65 respectively. Entrapped between the two levers is an inverted cup-shaped spring engaging member 66, the cup-shaped portion of which extends through the openings in the levers but which has a radially extending flange 67 which is sufficiently large so that it is maintained between the two levers. Intermediate cup-shaped member 66 and diaphragm 54 is a first loading spring 70 which is effective to urge the diaphragm 54 against spherical closure member 55 and hence to urge closure member 55 into engagement with port 51 to close off the port. At the same time, spring 70 urges the flange 67 into engagement with the underside of lever 60. Disposed between the underside of diaphragm 56 and the upperside of flange 67 on the spring engaging member, is a spring 71 which is of substantially negligible strength compared to the strength of spring 70. Spring 71 simply urges diaphragm 56 upward away from spring engaging member 66. Preferably there is associated with the levers 60 and 61 adjustment screws 75 and 76 respectively. These screws provide for selectively adjusting the minimum flow and full rate outlet pressure, respectively.

Intermediate diaphragm 56 and the upper wall of body member 46 of the valve 45, is a timing chamber 72 which is connected to chamber 47 (which in turn is connected to pressure chamber 23 of the main valve) by a passage 73. Passage 73 has provided therein a flow restrictor, such as that disclosed at 74 to provide a substantial time delay between the build up of pressure in chamber 47 and the build up of pressure in chamber 72.

The operation of the structure disclosed in FIGURE 1 will now be described. As shown in FIGURE 1, manual valve 20 is in a position so that the valve is ready for operation with the ports leading from the inlet to the inlet chamber and from the inlet to passage 37 open. With the operator 32 of control valve 30 in its off position, pressure chamber 23 is vented to outlet chamber 15 of the main valve through passage 44 and ports 43 and 35, passage 40 and chamber 41 of valve 30, and passage 42. Thus the pressure on opposite sides of diaphragm 21 is substantially equal and spring 26 is effective to move diaphragm 21 so as to close main valve closure member 25. Since main valve 25 is closed, the pressure in outlet 15 and in pressure chamber 23 will be substantially atmospheric. The pressure in timing chamber 72 of valve 45 will also gradually drop to the point where it is substantially atmospheric and weak spring 71 urges it to the position shown in FIGURE 1 so that it has no effect upon spring engaging member 66.

When the valve is to be placed in operation, operator 32 of control valve 30 is energized and valve closure member 33 moves into engagement with port 35. This closes the connection between chamber 23 and outlet chamber 15 and connects chamber 23 to the inlet through passage 36 and restriction 37. Pressure quite rapidly builds up in pressure chamber 23 and overcomes the force of spring 26 to open main valve 25, and thus to allow fluid to flow through the valve. Since chamber 52 is connected to outlet chamber 15 through substantially unrestricted passages 53 and 42, the pressure in chamber 52 builds up almost simultaneously with the pressure in outlet chamber 15. As soon as the outlet pressure has risen sufficiently to overcome spring 70, the pressure in chamber 52 is effective to raise diaphragm 54 and allow pressure to leak from chamber 47 which, it will be recalled, is connected through passage 50 to pressure chamber 23. Thus, diaphragm 54 and valve 55 are responsive to the outlet pressure of the main valve to maintain a pressure within pressure chamber 23 which is sufficient to position main valve 25 to maintain a substantially uniform pressure in outlet chamber 15. This pressure will be determined by the strength of spring 70 and the position of lever 60 in valve 45. At this point the valve will be operating at a minimum flow sufficient for safe and efficient ignition of a burner (not shown).

After a predetermined time, determined by the size of restriction 74 in passage 73, the pressure in chamber 72 builds up sufficiently to overcome relatively weak spring 71 and diaphragm 56 is moved downwardly. As this pressure reaches some predetermined level, the diaphragm 56 will engage the upper end of cup-shaped spring engaging member 66 and move it downwardly and thus increase the loading on spring 70. The cup-shaped member will be moved downward to a position wherein flange 67 thereon engages the upper surface of lever 61, this position being determined by the position of adjustment screw 76. This additional loading of spring 70 will result in the requirement of a substantially greater pressure to overcome spring 70 and open valve 55. This will cause the valve to regulate at a substantially greater or full flow pressure in outlet chamber 15. Whenever this pressure is exceeded the pressure in chamber 52 will raise diaphragm 54 and allow gas to escape through port 51 and hence partially evacuate pressure chamber 23 so that the main valve 25 will tend to close to compensate for the pressure rise.

After the pressure in chamber 72 has built up so as to additionally load modulating valve 45, the valve will continue to operate in this condition until such time as two position control valve 30 is operated to its off position. At this time chamber 23 will again be connected to outlet chamber 15 and main valve 25 will close since the pressure in outlet chamber 15 will rapidly drop to substantially atmospheric pressure. As noted previously, the pressure in chamber 72 will gradually drop so that spring 71, while substantially negligible with respect to spring 70, is sufficient to move diaphragm 56 upward away from spring engaging member 66.

The structure described above provides pressure regulation wherein the outlet pressure from the main valve is substantially uniform over a relatively wide range of inlet pressures and flow capacities. While it is desirable in many instances that the step function (that is, opening to minimum flow upon initial operation of the valve with pressure regulation at this level, and then, after a time delay, operation to a greater pressure) be provided, the servo valve described above will also find application in certain instances where the step is not required. When this is the case, restricted passage 73, timing chamber 72 and associated diaphragm 76, and lever 61 and its adjustment member 76 may be omitted. If so constructed, the valve regulates at a single level, chosen by the adjustment of member 75, but still maintains the advantage of uniform outlet pressure over a wide range of inlet pressures. This modification of the described structure is considered to be within the scope of our invention.

Figure 2:
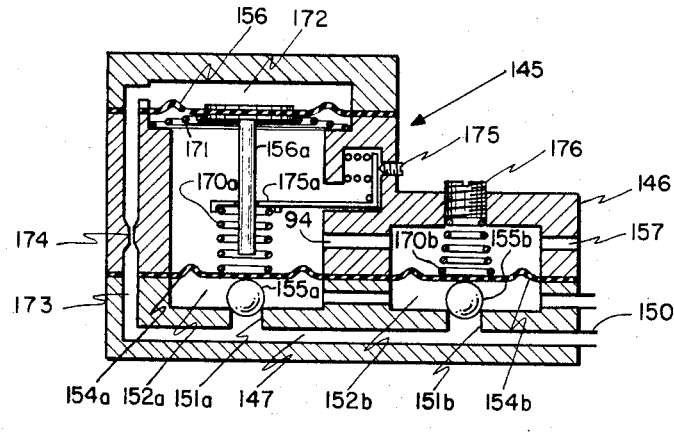
FIGURE 2 is a fragmentary schematic view of a pressure responsive modulating valve which may be substituted for a modulating valve disclosed in the structure of FIGURE 1.

FIGURE 2 discloses another modulating valve which may be substituted for modulating valve 45 which was disclosed in FIGURE 1 to provide the step opening function with pressure regulation at each of the two levels of the step and with the pressure operated means providing a time delay between the two levels. In FIGURE 2 the parts similar to those in valve 45 as disclosed in FIGURE 1 have been given similar numbers preceded by the numeral 1. For example, while the modulating valve was referred to by the numeral 45 in FIGURE 1, the modulating valve in FIGURE 2 is referred to by the numeral 145.

Modulating valve 145 has a valve body 146 having a chamber 147 which is connected to the pressure chamber 23 of the main valve by a passage 150. The valve also has an operating chamber 152, which corresponds to chamber 52 of the valve 45 but which is actually separated into two portions 152a and 152b. Chamber 152a is connected to chamber 147 by a port 151a while chamber 152b is connected to chamber 147 by a port or passage 151b. Cooperating with port 151a is a valve closure member 155a in chamber 152a and operably engaged by a diaphragm 154a. A spring 170a is disposed between diaphragm 154a and a lever 175a of an adjustable loading means 175. Spring 170a is yieldable to a pressure in chamber 152a corresponding to a minimum flow or igniting pressure of the main valve and hence the adjustment of the loading apparatus 175 determines the minimum flow pressure level of the valve. Connected to chamber 147 by a passage 173 having a restriction 174, is a timing chamber 172. This chamber has a movable wall such as diaphragm 156 which carries an abutment member 156a which may be moved downward by diaphragm 156 and into engagement with the upper surface of diaphragm 154a so as to force the valve 155a closed. A relatively weak spring 171 normally urges diaphragm 156 upward so that abutment member 156a is maintained out of engagement with diaphragm 154a and hence inoperative.

Cooperating with the port 151b is a valve closure member 155b which is disposed in chamber 152b and which is operably engaged by a diaphragm 154b. A spring 170b urges the diaphragm to a position to close valve closure member 155b against port 151b. The loading on this spring is adjusted by a manual adjustment member 176 which is threaded into the body 146. Spring 170b is a substantially stronger spring than spring 170a and is yieldable to an outlet pressure (and hence pressure in chamber 152) corresponding to the full flow pressure of the main valve. The area on the side of diaphragm 154b opposite from chamber 152, and the area between diaphragms 154a and 156, may be connected together by a passage 94 and these two areas in turn connected to atmosphere by a passage 157.

The operation of the pressure regulator valve with this modulating operator substituted for that disclosed in FIGURE 1 is substantially identical to the operation of the structure of FIGURE 1 as far as result is concerned. However, the specific operation of the structure utilizing modulating valve 145 will now be described. With two-position valve 30 in its "off" position as disclosed in FIGURE 1, chamber 23 is substantially at atmospheric pressure as is outlet chamber 15 and chamber 152 as well as the timing chamber 172. When two-position valve 30 is moved to the "on" position, pressure chamber 23 is connected to inlet pressure through passage 44 and main valve 25 is opened as pressure builds up in chamber 23. The pressure in chamber 23 and chamber 147 are substantially equal, while the pressure in chamber 152 is substantially equal to the pressure in outlet chamber 15. When the outlet pressure reaches the minimum flow level, the pressure in chamber 152a is sufficient to urge diaphragm 154a upward and overcomes the force of spring 170a to open valve closure member 155a. This relieves the pressure in chamber 152 and consequently in pressure chamber 23 so that the main valve moves towards the closed position. Thus the outlet pressure of the main valve is regulated at a pressure just sufficient to overcome the loading of spring 170a. At this time, the pressure is also building up in timing chamber 172 and, after a time delay determined by the size of restriction 174 in passage 173, the pressure in chamber 172 is sufficient to overcome weak spring 171 and to move diaphragm 156 downward. After a predeterminded amount of movement of diaphragm 156, abutment member 156a engages the upper surface of diaphragm 154a and forces closure member 155a closed against the port 151a. At this point the pressure in chamber 23 increases substantially and will continue to increase until it reaches a point where it is sufficient to overcome the force of spring 170b acting on diaphragm 154b. When the outlet pressure reaches this level, diaphragm 154b is urged upward and the pressure is released through port 151b upon the opening of valve 155b. At this time the valve will regulate at the full flow pressure level. It can be seen that the modification utilizing modulating valve 145 in place of valve 45 results in a substantially identical overall operation of the device.

The principles utilized in the servo valve of FIGURE 1 may also be applied to a conventional direct acting pressure regulator valve. A valve structure modified in this manner is disclosed in FIGURE 3. There a pressure regulator valve 200 has a main valve body 201 with an inlet chamber 202 and an outlet chamber 203 separated by a wall 204. Wall 204 has formed therein an aperture 205. A valve closure member 206 is disposed in inlet chamber 202 and cooperates with a valve seat 207 formed about the aperture 205. Closure member 206 is connected to a movable wall such as diaphragm 210 by a stem 211. Diaphragm 210 has one side exposed to pressure in outlet chamber 203 which urges it to a position to close the closure member 206 against seat 207. The other side of diaphragm 210 is exposed to a chamber 212 which is preferably connected to atmosphere by a passage 213. Also disposed in the chamber 212, in spaced, parallel relationship with diaphragm 210 is a diaphragm 214. The opposite side of diaphragm 214 is exposed to a timing chamber 215.

Also disposed in chamber 212 is a pair of generally parallel cantilevered levers 260 and 261 which correspond to the levers 60 and 61 disclosed in modulating valve 45 in FIGURE 1. Levers 260 and 261 have aligned apertures 264 and 265 respectively and disposed between the two levers is an inverted cup-shaped spring engaging member 266 which has a radially extending flange 267. A spring 270 is disposed between spring engaging member 266 and the upper surface of diaphragm 210 and urges the diaphragm downwardly to open valve closure member 206 and urges the spring engaging member upwardly so that flange 267 engages the upper side of lever 260. Intermediate diaphragm 214 and the upper surface of flange 267 of the spring engaging member is a relatively weak spring 271 which has negligible effect upon the loading provided by spring 270 but which is sufficient to normally maintain diaphragm 214 out of engagement with spring engaging member 266. Associated with levers 260 and 261 are a minimum flow adjustment member 275 and a full flow adjustment member 276, respectively.

Connected to the outlet chamber 203 of the pressure regulator, by appropriate means such as a pipe 216, is an on-off valve 217 having an inlet chamber 220, and an outlet chamber 221 separated by a wall 222. Wall 222 has an opening 223 formed therethrough and cooperating with this opening to control the flow of fuel therethrough is a valve closure member 224 which is controlled by an on-off operator 225. Operator 225 may be of any desired kind, for example, it may be a solenoid or other electromagnetic operator. Timing chamber 215 of the pressure regulator valve 200 is connected to outlet chamber 221 of valve 217 by a passage 226 which has a time delay flow restriction 227 disposed therein.

The operation of the structure disclosed in FIGURE 3 will be readily apparent in view of the description of the operation of the servo regulator valve described in connection with FIGURES 1 and 2. With the on-off valve 217 closed as shown in FIGURE 3, outlet chamber 221 of valve 217 is substantially at atmospheric temperature as is timing chamber 215. The gas pressure in inlet chamber 220 of valve 217 and in outlet chamber 203 of pressure regulator valve 200 will be substantially at the supply pressure and hence will normally urge diaphragm 210 upwardly to main valve closure member 206 in a closed position.

When operator 225 of the on-off valve 217 is energized, and valve closure member 224 opens, the pressure in valve 217, and consequently in outlet chamber 203 of the pressure regulator valve, will be dropped to substantially atmospheric. Spring 270 will urge diaphragm 210 downwardly to open valve closure member 206. Regulator valve 200 will then regulate the outlet pressure therefrom at a pressure determined by the loading on spring 270 which in turn is determined by the setting of adjustment member 275. This provides operation of the pressure regulator valve at the minimum flow position.

During this time pressure builds up in timing chamber 215 at a rate determined by the size of the restriction 227 in passage 226. After a predetermined time, the pressure in timing chamber 215 is sufficient to move diaphragm 214 downwardly in opposition to spring 271 so that diaphragm 214 engages the upper end of spring engaging member 266 and urges it downwardly. Diaphragm 214 will eventually move downward to a position wherein it causes the under surface of flange 267 to engage the upper surface of lever 261. This will additionally load the spring 270 and cause the regulator valve to operate at an increased outlet pressure corresponding to the full flow pressure level.

From the foregoing it can be seen that the structure of FIGURE 3 also provides the step opening function with pressure regulation at both of the outlet levels. The time delay and the additional loading is provided by a simple pressure operated structure operated by the pressure of the fluid being conveyed by the valve. If desired, a manually operable lever 77 may be provided to block the diaphragm 56 in its raised position to render it inoperative and thus cause the valve 25 to regulate outlet pressure at the lower rate only. A shaft 77a extends through body 46 and has a handle (not shown) on the outer end thereof for rotating the lever through a 90° arc.

It will be appreciated that the structure described above is by way of illustration of our invention only and that various modifications may be made thereto without departing from the spirit of the invention. The structure has been shown schematically for purposes of clarity. For example, the passages connecting various portions of the valve are shown externally of the valve body. Obviously, in an actual model of the device, these passages could be formed directly in the valve casting. Also, in FIGURES 1 and 2, timing chambers 72 and 172 are connected to pressure chamber 23 of the main valve. The only requirement for proper operation is that the timing chamber be connected to an area which is supplied with fluid pressure whenever pressure is applied to chamber 23 so that main valve 25 is opened. For example, the timing chamber may be connected directly to outlet chamber 15 or to inlet chamber 14 through valve 30. Since our disclosure herein may suggest various modifications to those skilled in the art, our invention is to be limited solely by the scope of the appended claims.

We claim:

1. A fluid pressure regulating valve comprising: a body having an inlet and an outlet separated by a wall having a valve port therethrough; a closure member cooperable with said port and movable between open and closed positions with respect thereto to control fluid flow through the valve; biasing means yieldably urging said closure member to said closed position; a pressure chamber having a movable wall operably connected to said closure member and responsive to pressure in said chamber to move said closure member to said open position in opposition to said biasing means; a control valve having first, second, and third ports and a closure member normally being in a first position wherein said first port is closed and said second and third ports are connected and operable to a second position wherein said third port is closed and said first and second ports are connected; flow limiting passage means connecting said first port to said inlet; passage means connecting said second port to said chamber; passage means connecting said third port to said outlet; pressure responsive valve means operably positioned intermediate said chamber and said outlet and including means responsive to fluid pressure at said outlet to move said valve means to an open position wherein said chamber is connected to said outlet, and loading means urging said valve means to a closed position and yieldable to a predetermined fluid pressure to permit such pressure to open the valve means; pressure responsive actuating means operably associated with said loading means and operable by a predetermined fluid pressure to increase the effective loading on said pressure responsive valve means so that said valve means opens only in response to a relatively higher fluid pressure; and restricted passage means connecting said actuating means to an area supplied with fluid pressure only when said control valve is in its second position so that upon initial opening of said main valve closure member, said pressure responsive valve means opens in response to a first, relatively low outlet pressure and thereby causes the valve to regulate at said first pressure and, after a time delay determined by the size of said restricted passage, said actuating means increases the effective loading so that said pressure responsive valve means opens in response to a second, relatively higher pressure and thereby causes the valve to regulate at said second pressure.

2. A fluid pressure regulating valve comprising: a body having an inlet and an outlet; a main closure member in said body and movable between open and closed positions to control fluid flow through the valve; biasing means yieldably urging said closure member to said closed position; a pressure chamber in said body; a movable wall operably connected to said closure member and having one side exposed to fluid pressure in said chamber and the opposite side exposed to fluid pressure at said outlet so that fluid pressure in said control chamber urges said movable wall and thereby said closure member to said open position in opposition to said biasing means and fluid pressure at said outlet urges said movable wall, and thereby said closure member, toward said closed position; a condition responsive control valve operable between a first position wherein it connects said chamber to said outlet and a second position wherein it connects said chamber to said inlet; modulating valve means intermediate said chamber and said outlet and including means responsive to fluid pressure at said outlet to move said valve means to an open position wherein said chamber is connected to said outlet and loading means urging said valve means to a closed position and yieldable to a predetermined fluid pressure to permit such pressure to open the valve means; pressure responsive actuating means operably associated with said loading means and operable by a predetermined fluid pressure, greater than ambient pressure, to increase the effective loading on said modulating valve means so that said modulating valve means opens only in response to a relatively high fluid pressure; and restricted passage means connecting said actuating means to an area supplied with fluid pressure when said control valve is in its second position so that upon initial opening of said main valve closure member, said modulating valve means opens in response to a first, relatively low outlet pressure and thereby causes the valve to regulate at said first pressure and, after a time delay determined by the size of said restricted passage, said actuating means increases the effective loading so that said modulating valve means opens in response to a second, relatively higher pressure and thereby causes the valve to regulate at said second pressure.

3. A fluid pressure regulating valve comprising: a body having an inlet and an outlet; a main closure member in said body and movable between open and closed positions to control fluid flow through the valve; biasing means yieldably urging said closure member to one of said positions; a pressure chamber having a movable wall operably connected to said closure member and responsive to pressure in said chamber to move said closure member to the other of said positions in opposition to said biasing means; a control valve operable between a first position wherein it connects said chamber to an area of low pressure and a second position wherein it connects said chamber to said inlet; modulating valve means associated with said chamber and operable to connect said chamber to an area of low pressure, said modulating valve means including means responsive to fluid pressure at said outlet to move said modulating valve means to a first position wherein the pressure in said chamber is varied to cause closing of said main closure member; loading means urging said modulating valve means to an opposite second position wherein the pressure in said chamber causes opening of said main closure member, said loading means being yieldable to a predetermined fluid pressure to permit such pressure to operate said modulating valve means to said first position; pressure responsive actuating means operably associated with said loading means and operable by a predetermined fluid pressure to change the effective loading on said modulating valve means so that said modulating valve means operates only in response to a relatively higher fluid pressure; and restricted passage means connecting said actuating means to an area of fluid pressure when said control valve is in its second position so that upon initial opening of said main valve closure member, said pressure responsive valve means operates in response to a first, relatively low outlet pressure and thereby causes the valve to regulate at said first pressure and, after a time delay determined by the size of the restriction in said restricted passage, said actuating means changes the effective loading so that said modulating valve means operates in response to a second, relatively higher pressure and thereby causes the main valve to regulate at said second pressure.

4. A fluid pressure regulating valve comprising: a body having an inlet and an outlet; a main closure member in said body and movable between open and closed positions to control fluid flow through the valve; biasing means yieldably urging said closure member to said closed position; a pressure chamber in said body; a movable wall operably connected to said closure member and having one side exposed to fluid pressure in said chamber so that fluid pressure in said chamber urges said movable wall and thereby said closure member to said open position in opposition to said biasing means; control valve means operable between a first position wherein it connects said chamber to exhause to close said main closure member and a second position wherein it connects said chamber to said inlet to open said main closure member; modulating valve means including first and second exhaust valve members operably disposed intermediate said chamber and exhaust and each including operating means responsive to fluid pressure at said outlet to move the associated exhaust valve member to an open position wherein said chamber is connected to exhaust; first loading means urging said first exhaust valve member to a closed position and yieldable to a first predetermined fluid pressure, greater than ambient, to permit said first exhaust valve to open and connect said control chamber to exhaust; second loading means urging said second exhaust valve member to a closed position and yieldable to a second predetermined, relatively greater, pressure to permit said second exhaust valve to open and connect said chamber to exhaust; pressure responsive actuating means associated with said first loading means and operable in response to a fluid pressure approximately equal to said first pressure to override the operating means for said first exhaust valve member and hold it closed; and a restricted passage connecting said actuating means to an area supplied with fluid pressure only when said control valve means is in its second position so that upon operation of said control valve means to said second position, the valve regulates outlet pressure at said first pressure and, after a time delay determined by the size of the restriction in said restricted passage, said first exhaust valve member is overridden and the valve regulates outlet pressure at said second pressure.

5. A fluid pressure regulating valve comprising: a body having an inlet and an outlet; a main closure member in said body and movable between open and closed positions to control fluid flow through the valve; biasing means yieldably urging said closure member to said closed position; a pressure chamber in said body; a movable wall operably connected to said closure member and having one side exposed to fluid pressure in said chamber so that fluid pressure in said chamber urges said movable wall and thereby said closure member to said open position in opposition to said biasing means; control valve means operable between a first position wherein it connects said chamber to exhaust to close said main closure member and a second position wherein it connects said chamber to said inlet to open said main closure member; modulating valve means including an exhaust valve member intermediate said chamber and exhaust and including operating means responsive to fluid pressure at said outlet to move the exhaust valve member to an open position wherein said chamber is connected to exhaust; loading means urging said exhaust valve member to a closed position and yieldable to a first predetermined fluid pressure, greater than ambient, to permit said exhaust valve member to open and connect said chamber to exhaust; pressure responsive actuating means associated with said loading means and operable in response to fluid pressure to additionally load said operating means for said exhaust valve member so that the effective loading thereon is yieldable only to a second predetermined, relatively greater pressure, to permit said exhaust valve member to open and connect said chamber to exhaust; and a restricted passage connecting said actuating means to an area supplied with fluid pressure only when said control valve means is in its second position so that, upon operation of said control valve means to said second position, the valve regulates outlet pressure at said first pressure and, after a time delay determined by the size of said restriction, said exhaust valve member is additionally loaded and the valve steps open and regulates outlet pressure at said second pressure.

6. The fluid pressure regulating valve of claim 5 wherein said restricted passage connects said actuating means to said pressure chamber.

7. The fluid pressure regulating valve of claim 5 wherein said restricted passage connects said actuating means to said outlet.

8. A fluid pressure regulating valve comprising: a body having an inlet and an outlet; a main closure member in said body and movable between open and closed positions to control fluid flow through the valve; biasing means yieldably urging said closure member to said closed position; a pressure chamber in said body; a movable wall operably connected to said closure member and having one side exposed to fluid pressure in said chamber so that fluid pressure in said chamber urges said movable wall, and thereby said closure member, to said open position in opposition to said biasing means; control valve means operable between a first position wherein it connects said chamber to exhaust to close said main closure member and a second position wherein it connects said chamber to said inlet to open said main closure member; modulating valve means operably disposed intermediate said chamber and exhaust and including means responsive to fluid pressure at said outlet to move said modulating valve means to an open position wherein said chamber is connected to exhaust; and loading means urging said modulating valve means to a closed position and yieldable to a predetermined fluid pressure to permit such pressure to open the modulating valve means and connect the chamber to exhaust so that, when said control valve means is in said second position and the main closure member is open, fluid pressure at said outlet is maintained substantially constant at said predetermined pressure.

9. A fluid pressure regulating valve comprising: a body having an inlet and an outlet; a main closure member in said body and movable between open and closed positions to control fluid flow through the valve; biasing means yieldably urging said closure member to said closed position; a pressure chamber in said body; a movable wall operably connected to said closure member and having one side exposed to fluid pressure in said chamber so that increasing fluid pressure in said chamber urges said movable wall and thereby said closure member to said open position in opposition to said biasing means; a passage between said inlet and said chamber; control valve means in said passage and operable to connect said chamber to said inlet to open said main closure member, the chamber being exhausted to said outlet when said control valve means is not so operated; modulating valve means intermediate said chamber and exahust and including means responsive to fluid pressure at said outlet to operate said modulating valve means to maintain a substantially constant pressure at said outlet when said control valve means is operated to connect said chamber to said inlet.

10. A fluid pressure regulating valve comprising: a body having an inlet and an outlet; a main closure member in said body and movable between open and closed positions to control fluid flow through the valve; biasing means yieldably urging said closure member to one of said positions; a pressure chamber in said body; a movable wall operably connected to said closure member and having one side exposed to fluid pressure in said chamber so that fluid pressure therein urges said movable wall and thereby said closure member to the other of said positions in opposition to said biasing means; a first passage between said inlet and said chamber; control valve means in said first passage and operable to connect said chamber to said inlet, said control valve means including means connecting the chamber to said outlet when said control valve means is not so operated; modulating valve means intermediate said chamber and exhaust and including means responsive to fluid pressure at said outlet to operate said modulating valve means to maintain a substantially constant pressure at said outlet when said control valve means is operated to open said main closure member.

11. In a pressure operated valve, the combination comprising: a valve body having an inlet, an outlet, a wall therebetween with an aperture therethrough and a main valve cooperable with the aperture to control the flow of fluid therethrough; a pressure chamber having a movable wall operably connected to said main valve; a first fluid passage between said inlet and said chamber; a manual valve in said body operable to control fluid flow from said inlet to said aperture and from said inlet to said first passage; a second fluid passage between said pressure chamber and said outlet; further valve means in said passages for controlling the pressure in said chamber, said further valve means including a two-position valve in one of said passages and a modulating valve in the other of said passages; and means responsive to outlet pressure for positioning said modulating valve to cause said main valve to maintain a uniform pressure in said outlet.

12. In a pressure operated valve having an inlet, an outlet, an apertured wall therebetween, a main valve cooperable with the aperture in said wall to control the flow of fluid therethrough and a mandrel valve operable to control fluid flow between the inlet and the aperture, the combination comprising: a pressure chamber having a movable wall operably connected to said main valve; a first fluid passage between said inlet and said chamber, the manual valve also controlling flow through said first passage and being operable between a closed position wherein it simultaneously interrupts flow to said aperture and said first passage and an open position wherein it does not substantially interfere with flow to said aperture and to said first passage; control valve means in said first passage for controlling fluid flow to said chamber; a second fluid passage between said pressure chamber and said outlet; modulating valve means in said second passage; and means responsive to outlet pressure for positioning said modulating valve means to maintain a uniform pressure in said outlet when said control valve means is open, the elements being so constructed and arranged that said pressure chamber is exhausted when said control valve means is closed.

13. In a pressure operated valve having an inlet, an outlet, an apertured wall therebetween and a main valve cooperable with the aperture in said wall to control the flow of fluid therethrough, the combination comprising: a pressure chamber having a movable wall operably connected to said main valve; a first fluid passage between said inlet and said chamber; control valve means in said first passage for controlling fluid flow to said chamber; a second fluid passage between said pressure chamber and said outlet; modulating valve means in said second passage; means responsive to outlet pressure for positioning said modulating valve means to maintain a uniform pressure in said outlet when said control valve means is open, the elements being so constructed and arranged that said control chamber is exhausted when said control valve means is closed; loading means acting upon said outlet pressure responsive means and rendering said means operative to maintain a first outlet pressure; and time delay means associated with said outlet pressure responsive mean to vary the loading thereon to render said means operative to cause said main valve to maintain a predetermined higher pressure in said outlet a predetermined time after said main valve opens.

14. The combination defined in claim 13 wherein said time delay means is actuated by the pressure of the fluid being controlled and wherein such fluid pressure is applied to said time delay means only when said control valve means connects said inlet to said pressure chamber.

15. The combination defined in claim 14 wherein there is associated with said time delay means, manual means selectively operable to render said time delay means inoperative to change the loading on said outlet pressure responsive means so that the valve continuously maintains said first outlet pressure.

16. In a pressure operated valve having an inlet, an outlet, an apertured wall therebetween and a main valve cooperable with the aperture in said wall to control the flow of fluid therethrough, the combination comprising: a pressure chamber having a movable wall operably connected to said main valve; a two-position control valve; a first fluid passage between said inlet and said control valve; a second fluid passage between said control valve and said pressure chamber; a third fluid passage between said control valve and said outlet, said control valve being operable between a first position wherein it connects said first and second fluid passages and a second position wherein it connects said second and third fluid passages; exhaust passage means between said pressure chamber and said outlet; modulating valve means in said exhaust passage means; and means responsive to outlet pressure for positioning said modulating valve means to maintain a uniform pressure at said outlet when said control valve is in said first position.

17. A pressure regulator valve comprising: a valve body having an inlet chamber and an outlet chamber separated by a wall having an opening therethrough; a valve closure member disposed in the inlet chamber and cooperable with said opening to control fluid flow therethrough; a first movable wall in said body, operably connected to said closure member and having one side exposed to pressure in said outlet chamber so that pressure in the outlet chamber urges said movable wall in a direction to close said closure member; a second movable wall in said body and spaced from said first movable wall; means connecting the space between said first and second movable walls to an area of low pressure; first loading means yieldably biasing said first movable wall in opposition to the pressure in said outlet chamber to cause the valve to regulate at a first outlet pressure; second loading means operably connected to said second movable wall and operable thereby to additionally bias said first movable wall in opposition to the pressure in said outlet chamber; means normally maintaining said second loading means operably disengaged from said first movable wall; means, including said second movable wall, defining a timing chamber the pressure in which urges said second movable wall in a direction to cause operation of said second loading means; a fluid passage connecting said timing chamber to said outlet chamber; and a time delay flow restriction in said fluid passage so that said second loading means remains inoperative for a period of time after the initiation of fluid flow through the valve and, after such period, sufficient fluid pressure builds up in said timing chamber to cause said second movable wall to operate said second loading means.

18. A pressure regulator valve comprising: a valve body having an inlet and an outlet separated by a wall having an opening therethrough; a valve closure member cooperable with said opening to control fluid flow therethrough; a first movable wall operably connected to said closure member and responsive to pressure at said outlet to position said closure member to maintain a constant fluid pressure at said outlet; a timing chamber including a second movable wall in said body; first loading means yieldably biasing said first movable wall to cause the valve to regulate at a first outlet pressure; second loading means operable by said second movable wall to additionally bias and first movable wall to cause the valve to regulate at a second, substantially greater, outlet pressure; means normally maintaining said second loading means inoperative; a fluid passage connecting said timing chamber to an area supplied with fluid pressure only upon initiation of fluid flow through the valve; and a time delay flow restriction in said fluid passage so that said second loading means remains inoperative for a period of time after the initiaton of fluid flow through the valve and, after such period, sufficient fluid pressure builds up in said timing chamber to cause said second movable wall to operate said second loading means.

19. Pressure regulating valve apparatus comprising: a valve body having an inlet, an outlet and a valve seat therebetween; a va. ie closure member cooperable with said valve seat to control fluid flow through the valve; a pressure responsive movable wall operably connected to said closure member and constructed and arranged so that fluid pressure at said outlet urges said movable wall in a direction to close said closure member on said seat; means associated with said movable wall to provide a force acting on said wall in opposition to the fluid pressure at said outlet and including resilient loading means operable between a first condition to effect outlet pressure regulation at a relatively low pressure and a second condition to effect outlet pressure regulation at a relatively higher pressure; pressure responsive means operably associated with said resilient loading means and effective upon application of a predetermined pressure thereto, to operate said loading means from said first condition to said second condition; and restricted fluid passage means connecting said pressure responsive means to an area supplied with fluid when said main closure member is open so that when fluid under pressure is initially supplied to said valve, the outlet pressure is regulated at said low pressure and, after a time delay determined by the size of said restriction, the outlet pressure is regulated at said relatively higher pressure.

20. In a fluid pressure regulator valve of the type having an inlet, an outlet, closure means operable to control fluid flow between the inlet and outlet, operating means including means operably connected to the closure means and responsive to fluid pressure at the outlet to position the closure means to maintain a substantially constant pressure at the outlet, and loading means acting upon the operating means in opposition to outlet pressure to determine the pressure at which the valve regulates, the improvement comprising: pressure responsive means operably associated with said loading means and adapted, upon application of a predetermined pressure thereto, to increase the effective loading on the operating means to thereby increase the regulated pressure at the outlet; fluid passage means connecting said pressure responsive means to an area supplied with fluid when flow through the valve is initiated; and time delay restriction means in said passage means so that upon initial application of fluid under pressure, the valve operates to regulate at a first outlet pressure and, after a time delay determined by the size of said restriction means, the pressure responsive means increases the effective loading on the operating means so that the valve regulates at a higher outlet pressure.

21. In combination: a pressure regulator valve of the type having an inlet and an outlet, control means including means responsive to outlet pressure and effective to maintain a substantially constant outlet pressure from the valve, and variable loading means associated with said control means and operable between a first condition wherein the effective loading causes said regulator to regulate at a first outlet pressure and a second condition wherein the effective loading causes said regulator to regulate at a second relatively greater outlet pressure; means normally maintaining said loading means in said first condition; pressure responsive means operably associated with said loading means and effective upon application of a predetermined pressure thereto to operate said loading means to said second condition; an on-off valve having an inlet connected to the outlet of said pressure regulator valve and an outlet adapted to be connected to a low pressure area; a fluid passage connecting said pressure responsive means to the outlet of said on-off valve; and time delay restriction means in said fluid passage means so that upon initial opening of said on-off valve said regulator valve regulates flow at said first outlet pressure and, after a time delay determined by the size of said restriction means, outlet pressure causes said pressure responsive means to operate said loading means to said second condition wherein said regulator regulates at said second outlet pressure.

22. A pressure regulator valve comprising: a valve body having an inlet and an outlet; a valve closure member in said body and operable to control fluid flow therethrough; operating means operably connected to said closure member and including means responsive to pressure at said outlet to position said closure member to maintain a uniform pressure at said outlet, said operating means including loading means opposing said outlet pressure and thereby determining the outlet pressure at which the valve regulates; means operable by the fluid pressure to additionally load said operating means to cause the valve to regulate at a predetermined higher pressure; means connecting said additional loading means to an area supplied with fluid only when flow through the valve is initiated; and time delay means associated with said additional loading means and rendering said additional loading means operable only after a predetermined time after initiation of flow through the valve.

References Cited

UNITED STATES PATENTS

| | | | |
|---|---|---|---|
| 1,301,405 | 4/1919 | Dexter | 137—505.14 |
| 2,148,509 | 2/1939 | Shafer | 137—505.14 X |
| 2,286,188 | 6/1942 | MacLean | 137—505.14 |
| 2,611,218 | 9/1952 | Spencer | 137—495 X |
| 2,833,304 | 5/1958 | Fish | 137—505.15 X |

M. CARY NELSON, *Primary Examiner.*

R. J. MILLER, *Assistant Examiner.*